US012143609B2

United States Patent
Zhang et al.

(10) Patent No.: US 12,143,609 B2
(45) Date of Patent: Nov. 12, 2024

(54) VIDEO DATA TRANSMISSION METHOD, VIDEO DATA DECODING METHOD, AND RELATED APPARATUSES

(71) Applicant: SUZHOU METABRAIN INTELLIGENT TECHNOLOGY CO., LTD., Jiangsu (CN)

(72) Inventors: Zhenlei Zhang, Jiangsu (CN); Tuo Li, Jiangsu (CN); Hongtao Man, Jiangsu (CN); Tongqiang Liu, Jiangsu (CN); Yulong Zhou, Jiangsu (CN); Xiaofeng Zou, Jiangsu (CN); Xiankun Wang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/564,050

(22) PCT Filed: Jun. 22, 2022

(86) PCT No.: PCT/CN2022/100477
§ 371 (c)(1),
(2) Date: Nov. 24, 2023

(87) PCT Pub. No.: WO2023/103336
PCT Pub. Date: Jun. 15, 2023

(65) Prior Publication Data
US 2024/0267544 A1    Aug. 8, 2024

(30) Foreign Application Priority Data

Dec. 6, 2021   (CN) .................. 2021114723327.5

(51) Int. Cl.
*H04N 19/423*   (2014.01)
*H04N 19/136*   (2014.01)
(Continued)

(52) U.S. Cl.
CPC ......... *H04N 19/423* (2014.11); *H04N 19/136* (2014.11); *H04N 19/172* (2014.11); *H04N 19/44* (2014.11); *H04N 19/46* (2014.11)

(58) Field of Classification Search
CPC .................................................. H04N 19/423
See application file for complete search history.

(56) References Cited

U.S. PATENT DOCUMENTS

| 5,174,641 A | 12/1992 | Lim |
| 2018/0338152 A1 | 11/2018 | Yamauchi |
| 2020/0225728 A1* | 7/2020 | Marchya ............... G06F 1/3265 |

FOREIGN PATENT DOCUMENTS

| CN | 101127819 A | 2/2008 |
| CN | 202206502 U | 4/2012 |

(Continued)

*Primary Examiner* — Jerry T Jean Baptiste
(74) *Attorney, Agent, or Firm* — IPro, PLLC (57) ABSTRACT

The present application discloses method for transmitting video data, applied to chip for substrate management control. The method includes: respectively storing video compression data into first storage space and second storage space according to ping-pong operation structure; reading data of the same byte length from the first storage space and the second storage space; determining whether similarity between first data to be transmitted and second data to be transmitted is greater than or equal to preset value; if yes, setting the first data to be transmitted added with first transmission identifier as the current frame of data, and setting a second transmission identifier corresponding to the first transmission identifier as the next frame of data; and sending the current frame data and the next frame data to video data receiving end.

20 Claims, 3 Drawing Sheets

(51) Int. Cl.
*H04N 19/172* (2014.01)
*H04N 19/44* (2014.01)
*H04N 19/46* (2014.01)

(56) References Cited

FOREIGN PATENT DOCUMENTS

| | | | |
|---|---|---|---|
| CN | 102810294 | A | 12/2012 |
| CN | 102946529 | A | 2/2013 |
| CN | 107835424 | A | 3/2018 |
| CN | 110532219 | A | 12/2019 |
| CN | 113709490 | A | 11/2021 |
| CN | 113873255 | A | 12/2021 |
| WO | 2011047330 | A2 | 4/2011 |

* cited by examiner

FIG. 7

VIDEO DATA TRANSMISSION METHOD, VIDEO DATA DECODING METHOD, AND RELATED APPARATUSES

CROSS-REFERENCE TO RELATED APPLICATION

This application claims priority to and benefits of Chinese Patent Application Serial No. 202111472327.5, and the title of "method for transmitting video data, method for decoding video data, and device thereof" filed with the State Intellectual Property Office of P. R. China on Dec. 6, 2021, the entire content of which is incorporated herein by reference.

FIELD

The present disclosure relates to the technical field of data processing and, more particularly, to a method for transmitting video data, method for decoding video data, and device thereof.

BACKGROUND

The transmission process of a video compression system of a traditional chip for substrate management control is: first, a Video Graphics Array (VGA) transmits video data of a HOST to a video compression control module to perform video compression, and after the compression is completed, the data is written into a double data rate memory (DDR), and an Ethernet media access control (EMAC) (Network Card) driver reads the compressed data, and the video data is transmitted to the remote by means of a network for remote display.

However, the inventor realizes that the above-mentioned traditional solution has the problem that the video data is large and occupies the network bandwidth. An important function of the chip for substrate management control is to realize remote monitoring and management. In application scenarios, besides the video compression function, many other functions also occupy the network bandwidth, for example remotely performing firmware update (a firmware file is transmitted to the local be means of the network) or reading/setting status information of a local server and the like. If the video function occupies a lot of the network bandwidth, it will have a great impact on other functions of the chip for substrate management control, and affect the performance of the chip for substrate management control to a certain extent or a large extent, especially when the local server encounters a situation that emergency processing is needed, and even the security risk of the local server is caused.

SUMMARY

In order to solve the technical problem above-mentioned, the present application provides a method for transmitting video data, applied to a chip for substrate management control, wherein the method for transmitting the video data includes:
Compressing the video data sent by a host end to obtain video compression data, and respectively storing the video compression data into a first storage space and a second storage space according to a ping-pong operation structure:
when a data transmission instruction is received, reading first data to be transmitted with a preset byte length from the first storage space, and reading second data to be transmitted with the preset byte length from the second storage space;
determining whether a similarity between the first data to be transmitted and the second data to be transmitted is greater than or equal to a preset value;
when the similarity between the first data to be transmitted and the second data to be transmitted is greater than or equal to the preset value, setting the first data to be transmitted added with a first transmission identifier as current frame data, and setting a second transmission identifier corresponding to the first transmission identifier as next frame data; and sending the current frame data and the next frame data to a video data receiving end.

According to an embodiment of the present application, after the step of, determining whether the similarity between the first data to be transmitted and the second data to be transmitted is greater than the preset value, the method further includes:
when the similarity between the first data to be transmitted and the second data to be transmitted is less than the preset value, setting the first data to be transmitted as the current frame data and setting the second data to be transmitted as the next frame data.

According to an embodiment of the present application, before the step of, setting the first data to be transmitted added with the first transmission identifier as the current frame data, the method further includes:
generating the first transmission identifier corresponding to the first data to be transmitted: wherein, the first transmission identifier includes an identification field Flag, a frame type field First_frame, a start position field Begin_cnt, and a repeated data length field pixel_num; and a value of the frame type field First_frame of the first transmission identifier is 1.

According to an embodiment of the present application, the step of, setting the first data to be transmitted added with a first transmission identifier as the current frame data includes:
adding the first transmission identifier before the first data to be transmitted to obtain the current frame data.

According to an embodiment of the present application, before the step of, setting a second transmission identifier corresponding to the first transmission identifier as the next frame data, the method further includes:
generating the second transmission identifier corresponding to the first transmission identifier: among them, the second transmission identifier includes an identification field Flag, a frame type field First_frame, a start position field Begin_cnt, and a repeated data length field pixel_num: the value of the frame type field First_frame of the second transmission identifier is 0, and the value of the identification field Flag, the start position field Begin_cnt and the repeated data length field pixel_num in the second transmission identifier are all the same as those of the first transmission identifier.

The present application further provides a method for decoding video data, applied to a video data receiving end, wherein the method for decoding the video data includes:
receiving the current frame data and the next frame data transmitted by the chip for substrate management control, by means of the method for transmitting video data above-mentioned;
determining whether the current frame data includes a first transmission identifier: when the current frame data comprises the first transmission identifier, decoding the first data to be transmitted in the current frame data to obtain a first decoding result, and adding the first decoding result to a cache;

determining whether the next frame data includes a second transmission identifier: if yes, reading the first decoding result from the cache as a second decoding result corresponding to the next frame data; and generating video data to be displayed according to the first decoding result and the second decoding result.

The present application further provides a device for transmitting video data, applied to a chip for substrate management control, among them the device for transmitting the video data includes:

a data storage module, configured for compressing video data sent by a host end to obtain video compression data, and respectively storing the video compression data into a first storage space and a second storage space according to a ping-pong operation structure;

a data reading module, configured for when receiving a data transmission instruction, reading first data to be transmitted with a preset byte length from the first storage space, and reading second data to be transmitted with the preset byte length from the second storage space;

a similarity determination module, configured for determining whether a similarity between the first data to be transmitted and the second data to be transmitted is greater than or equal to a preset value;

a data setting module, configured for when the similarity between the first data to be transmitted and the second data to be transmitted is greater than or equal to the preset value, setting the first data to be transmitted added with a first transmission identifier as current frame data, and setting a second transmission identifier corresponding to the first transmission identifier as next frame data; and a data transmission module, configured for sending the current frame data and the next frame data to a video data receiving end.

The present application further provides a device for decoding video data, wherein the device for decoding video data is applied to a video data receiving end, including:

a data receiving module, configured for receiving the current frame data and the next frame data transmitted by the chip for substrate management control, by means of the method for transmitting video data above-mentioned;

a first determination module, configured for determining whether the current frame data includes a first transmission identifier: if yes, decoding the first data to be transmitted in the current frame data to obtain a first decoding result, and adding the first decoding result to a cache;

a second determination module, configured for determining whether the next frame data includes a second transmission identifier: when the current frame data comprises the first transmission identifier, reading the first decoding result from the cache as a second decoding result corresponding to the next frame data; and a display module, configured for generating video data to be displayed according to the first decoding result and the second decoding result.

The present application further provides a non-transitory computer-readable storage medium, wherein the storage medium has a computer-readable instruction stored thereon, and when the computer-readable instruction is executed, the step of the method for transmitting the video data above-mentioned and/or the step of the method for decoding the video data above-mentioned.

The present application further provides an electronic apparatus, wherein the apparatus includes a memory and one or more processors, wherein computer-readable instructions are stored in the memory, and when the computer-readable instructions in the memory are invoked by the one or more processors, the step of the method for transmitting the video data above-mentioned and/or the step of the method for decoding the video data above-mentioned.

Details of one or more embodiments of the present application are set forth in the following drawings and description. Other features and advantages of the present application will be apparent from the description, drawings and claims.

BRIEF DESCRIPTION OF THE DRAWINGS

In order to illustrate the embodiments of the present application more clearly, the drawings that are required in the description of the embodiments will be briefly introduced below. Apparently, the drawings in the following description are merely some embodiments of the present application, and other drawings may be obtained according to these drawings without creative work for a person skilled in the art.

DETAILED DESCRIPTION

In order to make the purposes, technical solutions and advantages of the embodiments of the present application clearer, the technical solutions in the embodiments of the present application will be clearly and completely described below with reference to the drawings in the embodiments of the present application. Apparently, the described embodiments are merely some of the embodiments of the present application, not all of the embodiments. Based on the embodiments of the present application, all other embodiments obtained by a person skilled in the art without creative work shall fall within the protection scope of the present application.

Figure 1:
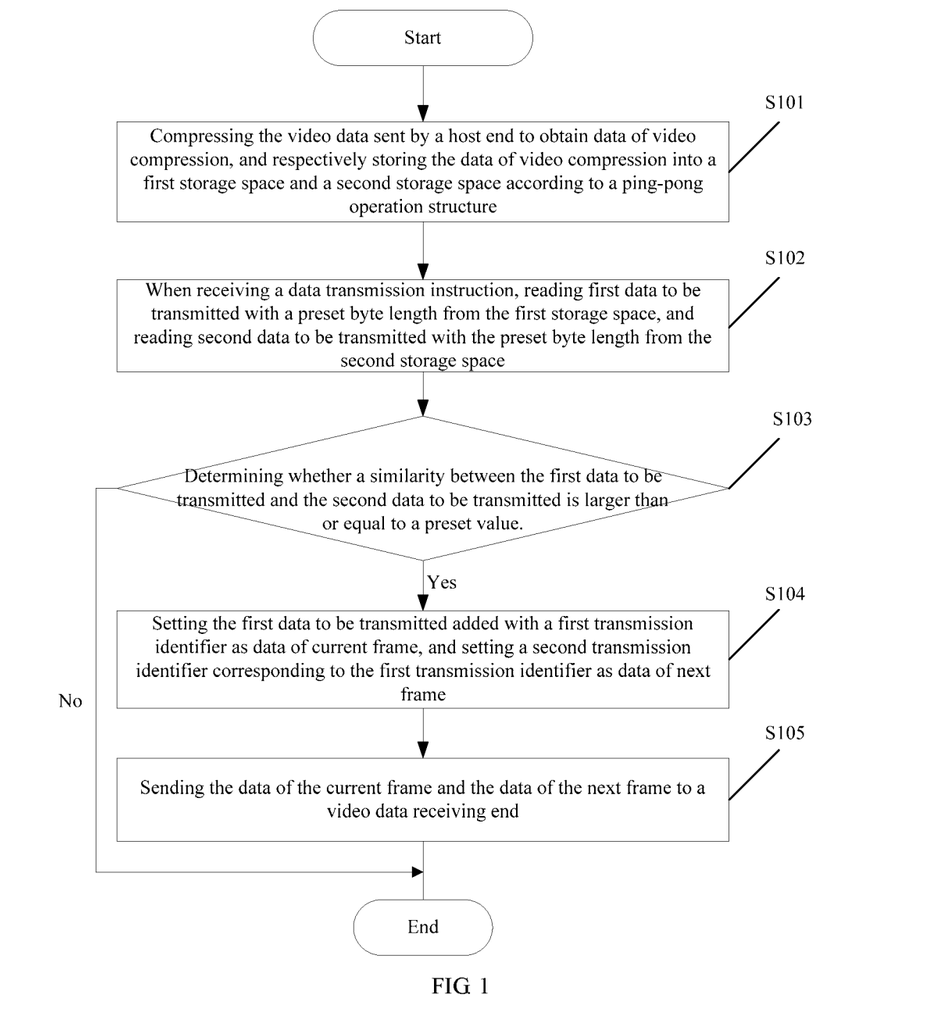
FIG. 1 is a flow chart of the method for transmitting video data according to one or more embodiments of the present application.

Please refer to FIG. 1, which is the flow chart of the method for transmitting video data provided by one or more embodiments of the present application.

The method for transmitting the video data may include:

S101: Compressing the video data sent by a host end to obtain video compression data, and respectively storing the video compression data into a first storage space and a second storage space according to a ping-pong operation structure.

Among them, the present embodiment may be applied to a chip for substrate management control. A system of substrate management control generally refers to a system that monitors the status of a server (temperature, fan, situation of main CPU operation, and so on) in the server field. The chip for substrate management control may also transmit local video data to the remote end by means of the network for remote display and monitoring.

After receiving the video compression data sent by the host end, by means of a video compression module, compressing the video data to obtain the data of video compress. After obtaining the data of video compress, writing into two areas of A and B of DDR respectively in units of frames, according to the ping-pong operation structure. That is, the frame 0 is written into address A, the frame 1 is written into address B, the frame 2 is written into address A and the frame 3 is written into address B, and so on. By means of the above-mentioned way, the first storage space is capable to store the video compression data of odd frames, and the second storage space is capable to store the video compression data of even frames. When comparing the data of adjacent frames, according to the present embodiment, the N-th frame is compared with the (N+1)-th frame, the (N+2)-th frame is compared with the (N+3)-th frame, the (N+4)-th frame is compared with the (N+5)-th frame, and so on. After comparing the data of adjacent frames, the next frame data (after modifying by adding the identifier) may be temporarily stored, the current frame data is sent, and the next frame data is sent thereafter. For example, when comparing the frame 0 and the frame 1, reading back both the frame 0 and the frame 1 are from the DDR, since the frame 0 is sent first, and the frame 1 is sent thereafter, so that the first frame (after the identifier is added) is required to be temporarily stored.

S102: When a data transmission instruction is received, reading first data to be transmitted with a preset byte length from the first storage space, and reading second data to be transmitted with the preset byte length from the second storage space.

Among them, after the data transmission instruction is received, reading the first data to be transmitted and the second data to be transmitted with the same length from the first storage space and the second storage space, respectively. As a feasible implementation, according to the present embodiment, counting the network bandwidth in real time, and the read data length is determined according to the network bandwidth. That is, the preset byte length is determined according to the network bandwidth, and the size of the network bandwidth is positively correlated with the preset byte length.

S103: Determining whether a similarity between the first data to be transmitted and the second data to be transmitted is greater than or equal to a preset value: if yes, entering S104, if no, ending the process.

Among them, in the present embodiment, since the video compression data are stored in the first storage space and the second storage space respectively according to the ping-pong operation structure, the first data to be transmitted and the second data to be transmitted are video data of adjacent frames. By determining whether the similarity between the first data to be transmitted and the second data to be transmitted is greater than or equal to the preset value, whether the image content corresponding to the first data to be transmitted and the image content corresponding the second data to be transmitted are the same is determined. In response to the similarity between the first data to be transmitted and the second data to be transmitted being greater than or equal to the preset value, the related operation of S104 is performed. In response to the similarity between the first data to be transmitted and the second data to be transmitted being less than the preset value, ending the operation flow of the present embodiment, setting the first data to be transmitted as the current frame data and setting the second data to be transmitted as the next frame data, so that the current frame data and the next frame data is sent to a video data receiving end. Consequently, after determining whether the similarity between the first data to be transmitted and the second data to be transmitted is greater than the preset value, the method may further include, in response to that the similarity between the first data to be transmitted and the second data to be transmitted being less than the preset value, setting the first data to be transmitted as the current frame data and setting the second data to be transmitted as the next frame data.

According to the present embodiment, a first transmission identifier corresponding to the first data to be transmitted may be generated. Among them, the first transmission identifier includes an identification field Flag, a frame type field First_frame, a start position field Begin_cnt, and a repeated data length field pixel_num; and the frame type field First_frame of the first transmission identifier has a value of 1. According to the present embodiment, a second transmission identifier corresponding to the first transmission identifier: among them, second transmission identifier corresponding to the first transmission identifier may also be generated; among them, the second transmission identifier includes an identification field Flag, a frame type field First_frame, a start position field Begin_cnt, and a repeated data length field pixel_num. The value of the frame type field First_frame of the second transmission identifier is 0), and the value of the identification field Flag, the start position field Begin_cnt and the repeated data length field pixel_num in the second transmission identifier are all the same as those of the first transmission identifier.

S104: Setting the first data to be transmitted added with a first transmission identifier as current frame data, and setting a second transmission identifier corresponding to the first transmission identifier as next frame data.

As a feasible implementation, the present embodiment may add the first transmission identifier before the first data to be transmitted to obtain the current frame data.

S105: Sending the current frame data and the next frame data to a video data receiving end.

According to the present embodiment, the video compression data are stored in the first storage space and the second storage space, respectively, according to the ping-pong operation structure. When the video compression data is required to be transmitted to a data receiving end, reading the first data to be transmitted with the preset byte length from the first storage space, and reading the second data to be transmitted with the preset byte length read from the second storage space. When the similarity between the first data to be transmitted and the second data to be transmitted is greater than or equal to the preset value, the two pieces of data are considered as data with the same content. At this point, setting the first data to be transmitted with the first transmission identifier as the current frame data, and setting the second transmission identifier corresponding to the first transmission identifier as the next frame data, and sending the current frame data and the next frame data to the video data receiving end. In this way, repeated transmission of the same data is avoided, so that the occupation of the network bandwidth by data transmission is reduced.

Figure 2:
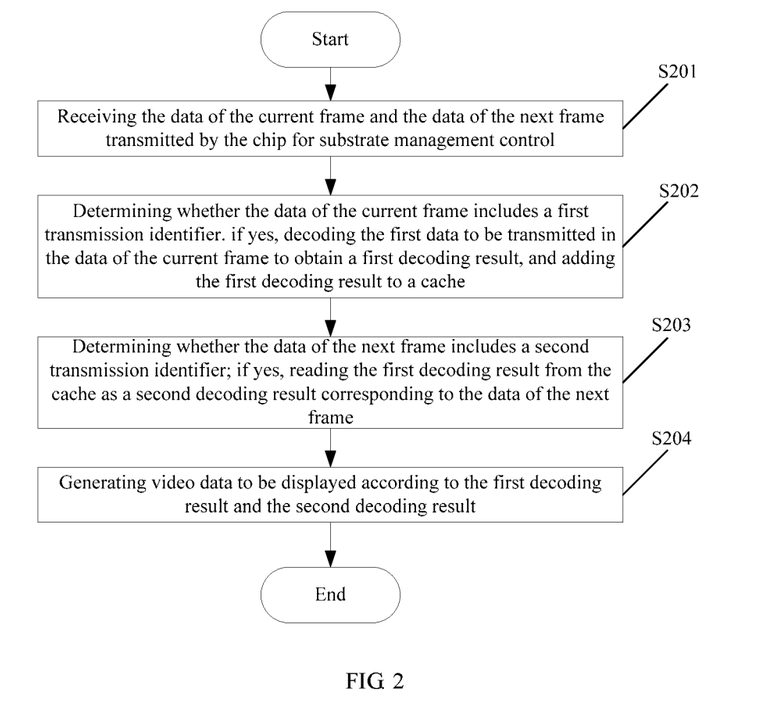
FIG. 2 is a flowchart of the method for transmitting video data provided by one or more embodiments of the present application.

Please refer to FIG. 2, which is a flowchart of method for decoding video data provided by an embodiment of the present application.

The steps of the method for decoding video data may include:

S201: Receiving the current frame data and the next frame data transmitted by the chip for substrate management control, by means of the method for transmitting video data above-mentioned.

The present embodiment is capable to be applied to a video data receiving end, and the current frame data and the next frame data may be data transmitted according to the method for transmitting video data of the corresponding embodiment in FIG. 1.

S202: Determining whether the current frame data includes a first transmission identifier; if yes, decoding the first data to be transmitted in the current frame data to obtain a first decoding result, and adding the first decoding result to a cache. Further, when the current frame data does not include the first transmission identifier, decoding the current frame data and the next frame data directly to obtain a first decoding result and a second decoding result.

In response to that the current frame data includes the first transmission identifier, decoding the first data to be transmitted in the current frame data to obtain the first decoding result, and adding the first decoding result to the cache. In response to that the current frame data does not include the first transmission identifier, decoding the current frame data and the next frame data directly to obtain the first decoding result and the second decoding result.

S203: Determining whether the next frame data includes a second transmission identifier; if yes, reading the first decoding result from the cache as a second decoding result corresponding to the next frame data.

Further, when the next frame data does not include the second transmission identifier, decoding the next frame data to obtain a second decoding result.

In response to that the next frame data includes the second transmission identifier, reading the first decoding result from the cache as a second decoding result corresponding to the next frame data. In response to that the next frame data does not include the second transmission identifier, decoding the next frame data to obtain the second decoding result.

S204: Generating video data to be displayed according to the first decoding result and the second decoding result.

According to the method of the present embodiment, receiving the current frame data and the next frame data transmitted by the method of the embodiment corresponding to FIG. 1. When the current frame data includes the first transmission identifier, it indicates that the current frame data is the first frame of repeated data. When the next frame data includes the second transmission identifier, it indicates that the next frame data is the repeated data of the current frame data. At this point, the first decoding result may be read from the cache as the second decoding result corresponding to the next frame data, and the video data to be displayed is generated according to the first decoding result and the second decoding result. By means of the method above-mentioned, repeated transmission of the same data is capable to be avoided, so that the occupation of network bandwidth by data transmission and the calculation amount of the decoding data are reduced.

The processes described in the above-mentioned embodiments are explained below by embodiments in practical applications.

Figure 3:
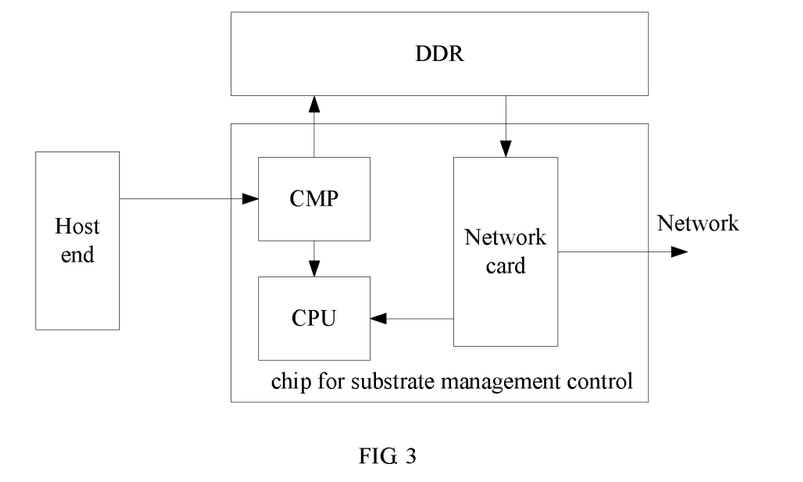
FIG. 3 is a schematic diagram of a transmission solution for data of compression video in the conventional solution.

Please refer to FIG. 3, which is a schematic diagram of a transmission solution for data of compression video in the conventional solution. The transmission flow of the data of the compression video provided by the present embodiment includes: transmitting video data of a HOST to a video compression control module (CMP, compress) of the chip for substrate management control: by the video compression control module, compressing the original video data, and writing the compressed data into the DDR. By a network driver, initiating a command to read the data of the compression video, and packaging the read-back data in the network. By the network card EMAC, converting the network package containing the video data into an Ethernet frame format, and sending it to a port physical layer (PHY). By the PHY, transmitting the video data to the remote end by means of a network cable/network.

In the above-mentioned traditional solution, existing the following disadvantages: the video data of the host graphics card is constantly generated, and when a huge amount of the video data with is sent by means of the network, it will greatly occupy the network bandwidth, and an important function of the chip for substrate management is to realize remote monitoring and management. In application scenarios, besides the video compression function, many other functions also occupy the network bandwidth, for example remotely performing firmware update (a firmware file is transmitted to the local be means of the network) or reading/setting status information of a local server and the like. If the video function occupies a lot of the network bandwidth, it will have a great impact on other functions of the chip for substrate management control, and affect the performance of the chip for substrate management control to a certain extent or a large extent, especially when the local server encounters a situation that emergency processing is needed, and even the security risk of the local server is caused. At this point, if the System on Chip (SoC system) is required to run a relatively application (which need quick response), the system will not be capable to satisfy this requirement. The SoC is a system on chip, which integrates a microprocessor, an analog Internet Protocol (IP) core, a digital IP core and a memory (or an off-chip storage control interface) on a single chip. The SoC is generally customized by a customer or a standard product for a specific purpose.

In view of the problems in the above-mentioned traditional solution, the present application provides a new solution to reduce the network bandwidth occupation of the chip for substrate management control. The present solution is optimized on the basis of the traditional solution. When writing the compression data, the video compression module writes the data into two areas (two address spaces) of A and B of DDR by adopting the ping-pong operation, and by the EMAC driver, sequentially reading the data of the two areas of A and B, respectively. A comparator (COMP) comparison unit is added inside the EMAC to compare the consistency of the video data of two frames before and after under the length of the current descriptor. When the next frame data is the same as the data of the previous frame under the current descriptor, modifying the corresponding data into a flag bit, and when performing decoding video at the remote end, parsing the corresponding flag bit data. Since in a real application scenario, the probability that the two frames before and after change little or nothing, or merely change locally is extremely high, so that the present solution is capable to greatly reduce the amount of video data transmitted by the network.

Figure 4:
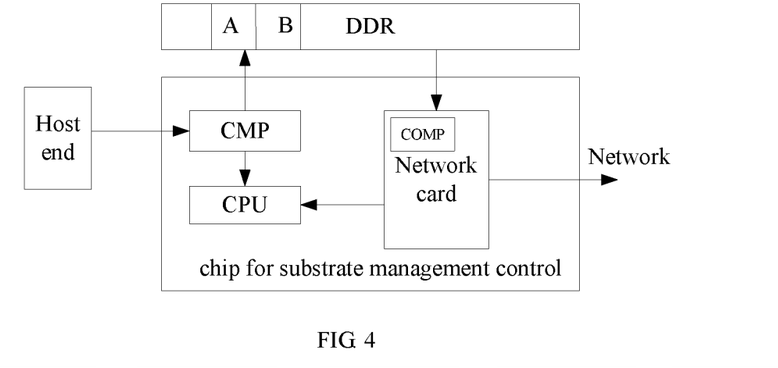
FIG. 4 is a schematic diagram of a transmission solution for data of compression video provided by one or more embodiments of the present application.

Please refer to FIG. 4, which is schematic diagram of a transmission solution for data of compression video provided by one or more embodiments of the present application. The implementation flow of the present solution is as follows:

Step 1: By a host end, transmitting the video data to a video compression control module CMP of the chip for substrate management control.

Among them, by a local graphics card, outputting data of an original image, by the video compression control module CMP, compressing the video according to requirements before being transmitted to the remote end by means of the network, to reduce the amount of the video data and occupation of the network bandwidth.

Step 2: After the video is compressed by the video compression module CMP, writing into two areas of A and B of DDR respectively in units of frames, according to the ping-pong operation structure. That is, the frame 0 is written into address A, the frame 1 is written into address B, the frame 2 is written into address A and the frame 3 is written into address B, and so on.

Step 3: By the network driver running on the central processing unit (CPU), initiating the operations of reading the A and B addresses in sequence. It is worth noting that, the length of the read data is required to be unified for every time the operation is initiated, for example, the lengths of the read data are all 256 bytes or 1024 bytes and so on. At the same time, this data length may be adjusted by a user according to real-time statistical of the network bandwidth, to reduce the network bandwidth occupied by video data to the greatest extent.

Step 4: By the COMP (compare unit) newly added to the network card EMAC, comparing the compressed video data read back by the network driver this time, and when they are consistent, the corresponding next frame data is modified into the form of an identifier, with a format of {Flag.fisrt_frame, begin_CNT.pixel_num}, among them the flag is the identifier, which may be set to be 32'hFFFFFFFF by reference, and FIRT_frame is set to be 0, it indicates that the current data is the next frame, which is the data that required to be completed at the decoding end. The Begin_cnt represents the start position of the current data segment in the frame, and the pixel_num indicates the length of repeated data.

Further, corresponding to the modification of the current frame, the identifier {Flag.fisrt_frame, begin_CNT.pixel_num} is required to be added before the data end that is duplicated with the next frame, among them the flag is the identifier, which may be set to be 32'hFFFFFFFF by reference, and FIRT_frame is set to be 1, indicating that the current data is the current frame, which is required to be cached at the decoding end (for the purpose of completing the data in the next frame). The Begin_cnt, indicating the start position of the current data segment in the frame, and the pixel_num indicates the length of the repeated data. According to the above discussion, the current frame is required to be transmitted the identifier+duplicate data terminal, while the next frame is merely required to be transmitted the identifier.

Step 5: By the network card EMAC, sending the data of two frames compared by the COMP module to the remote end respectively, and by decoding program of the remote end, decoding the data of the two frames accordingly. After detecting that the Flag=32'hFFFFFFFF, detecting the FIRT_frame. When FIRT_frame=1, caching the data with a number of pixel_num that starting from the Begin_cnt. At the same time, after detecting the Flag=32'h FFFFFFFF. When FIRT_frame is detected again, and if FIRT_frame=0, reading the data with the number of pixel_num directly from the cache sequentially to complete the current frame.

The present embodiment is optimized on the basis of the traditional solution. When writing the compression data, the video compression module writes the data into two areas (two address spaces) of A and B of DDR by adopting the ping-pong operation, and by the EMAC driver, sequentially reading the data of the two areas of A and B in respectively. A comparator (COMP) comparison unit is added inside the EMAC to compare the consistency of the video data of two frames before and after under the length of the current descriptor. When the next frame data is the same as the data of the previous frame under the current descriptor, modifying the corresponding data into a flag bit, and correspondingly modifying the current frame data at the same time (adding the identifier). When performing decoding video at the remote end, parsing the corresponding flag bit data, and completing the data. Since in a real application scenario, the probability that the two frames before and after change little or nothing, or merely change locally is extremely high, so that the present solution is capable to greatly reduce the amount of video data transmitted by the network.

In the present embodiment, a COMP comparison function is added inside the network card EMAC to compare the data consistency of the data of two frames at the same area. When the data are consistent, merely the identifier is transmitted in the area corresponding to the next frame, and transmitting the identifier and normal data of the current frame data, and the next frame data is completed at the decoding end, so that the amount of the video data transmitted by the network is greatly reduced, the occupation of the network bandwidth is reduced, and the system performance is improved. In the present embodiment, the network driver is capable to detect the network bandwidth in real time, and dynamically adjust the data length in DDR read by the network driver, to achieve the optimal data length. According to the present embodiment, the ping-pong structure is used to store the video compression data, and merely portion of the traditional solution is modified, and is not complicated to realize, but the amount of the video data of the chip for substrate management control is greatly reduced, and the occupation of the network bandwidth is reduced.

Figure 5:
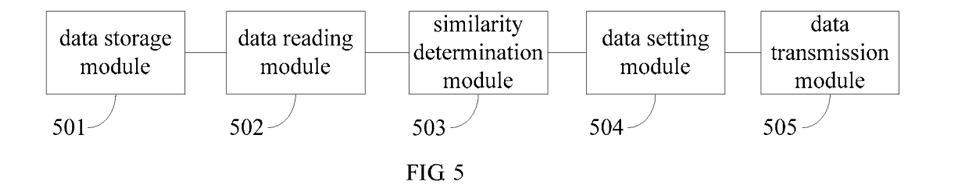
FIG. 5 is a structural schematic diagram of the device for transmitting video data provided by one or more embodiments of the present application.

Please refer to FIG. 5, which is a structural schematic diagram of the device for transmitting video data provided by one or more embodiments of the present application. This device is applied to a chip for substrate management control, and the device for transmitting the video data includes:

A data storage module 501, configured for compressing the video data sent by a host end to obtain video compression data, and respectively storing the video compression data into a first storage space and a second storage space according to a ping-pong operation structure.

A data reading module 502, configured for when receiving a data transmission instruction, reading first data to be transmitted with a preset byte length from the first storage space, and reading second data to be transmitted with the preset byte length from the second storage space.

A similarity determination module 503, configured for determining whether a similarity between the first data to be transmitted and the second data to be transmitted is greater than or equal to a preset value.

A data setting module 504, configured for when the similarity between the first data to be transmitted and the second data to be transmitted is greater than or equal to the preset value, setting the first data to be transmitted added with a first transmission identifier as current frame data, and setting a second transmission identifier corresponding to the first transmission identifier as next frame data.

A data transmission module 505, configured for sending the current frame data and the next frame data to a video data receiving end.

In the present embodiment, respectively storing the video compression data into the first storage space and the second storage space according to the ping-pong operation structure. When the video compression data are required to be transmitted to a data receiving end, reading the first data to be transmitted with the preset byte length from the first storage space, and reading the second data to be transmitted with the preset byte length from the second storage space. When the similarity between the first data to be transmitted and the second data to be transmitted is greater than or equal to the preset value, the two pieces of data are considered to be data with the same content, and in this point, setting the first data to be transmitted added with a first transmission identifier as current frame data, and setting a second transmission identifier corresponding to the first transmission identifier as next frame data, and sending the current frame data and the next frame data to the video data receiving end. In this way, repeated transmission of the same data is capable to be avoided, so that the occupation of network bandwidth by data transmission is reduced.

Further, the device further include:

A data setting module, configured for after the step of, determining whether the similarity between the first data to be transmitted and the second data to be transmitted is greater than the preset value, when the similarity between the first data to be transmitted and the second data to be transmitted is less than the preset value, setting the first data to be transmitted as the current frame data and setting the second data to be transmitted as the next frame data.

Further, the device further include:

A first identifier generating module, configured for before the step of, setting the first data to be transmitted added with the first transmission identifier as the current frame data, generating the first transmission identifier corresponding to the first data to be transmitted: among them, the first transmission identifier includes an identification field Flag, a frame type field First_frame, a start position field Begin_cnt, and a repeated data length field pixel_num; and a value of the frame type field First_frame of the first transmission identifier is 1.

Further, the data setting module 504 is configured for adding the first transmission identifier before the first data to be transmitted to obtain the current frame data.

Further, the device further include:

A second identifier generating module, configured for before the step of, setting a second transmission identifier corresponding to the first transmission identifier as the next frame data, generating the second transmission identifier corresponding to the first transmission identifier; among them, the second transmission identifier includes an identification field Flag, a frame type field First frame, a start position field Begin_cnt, and a repeated data length field pixel_num; the value of the frame type field First_frame of the second transmission identifier is 0), and the value of the identification field Flag, the start position field Begin_cnt and the repeated data length field pixel_num in the second transmission identifier are all the same as those of the first transmission identifier.

Figure 6:
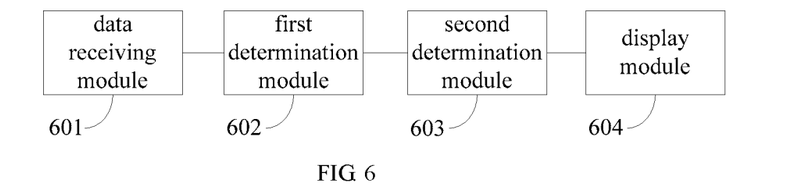
FIG. 6 is a structural schematic diagram of the device for decoding video data provided by one or more embodiments of the present application.

Please refer to FIG. 6, which is a structural schematic diagram of the device for decoding video data provided by one or more embodiments of the present application. This device is applied to a video data receiving end, among them the device for decoding the video data includes:

A data receiving module 601, configured for receiving the current frame data and the next frame data transmitted by the chip for substrate management control, by means of the method for transmitting video data above-mentioned.

A first determination module 602, configured for determining whether the current frame data includes a first transmission identifier: if yes, decoding the first data to be transmitted in the current frame data to obtain a first decoding result, and adding the first decoding result to a cache.

A second determination module 603, configured for determining whether the next frame data includes a second transmission identifier: if yes, reading the first decoding result from the cache as a second decoding result corresponding to the next frame data.

A display module 604, configured for generating video data to be displayed according to the first decoding result and the second decoding result.

According to the present embodiment, receiving the current frame data and the next frame data transmitted by the corresponding embodiment of FIG. 1. When the current frame data includes the first transmission identifier, it indicates that the current frame data is the first frame of repeated data. When the next frame data includes the second transmission identifier, it indicates that the next frame data is the repeated data of the current frame data. At this point, reading the first decoding result from the cache as the second decoding result corresponding to the next frame data, and generating video data to be displayed according to the first decoding result and the second decoding result. In this way, repeated transmission of the same data is capable to be avoided, so that the occupation of network bandwidth by data transmission and the calculation amount of decoding data are reduced.

Since the embodiment of the device portion is corresponding to the embodiment of the method portion, please refer to the description of the embodiment of the method portion for the embodiment of the device portion, which will not be repeated herein.

The present application further provides a non-transitory computer-readable storage medium has a computer-readable instruction stored thereon, and when the computer-readable instruction is executed, implementing the above-mentioned method for transmitting video data and/or the above-mentioned method for decoding video data. The storage medium may include various media that may store program codes, for example a USB flash disk, a mobile hard disk, a Read-Only Memory (ROM), a Random Access Memory (RAM), a magnetic disk or an optical disk and the like.

The present application further provides an electronic apparatus, which may include a memory and one or more processors, among them computer-readable instructions are stored in the memory, and when the computer-readable instructions in the memory are invoked by the one or more processors, implementing the step provided by the method for transmitting the video data and/or the method for decoding the video data. Certainly, the electronic apparatus may also include various network interfaces, a power supply and other components.

Figure 7:
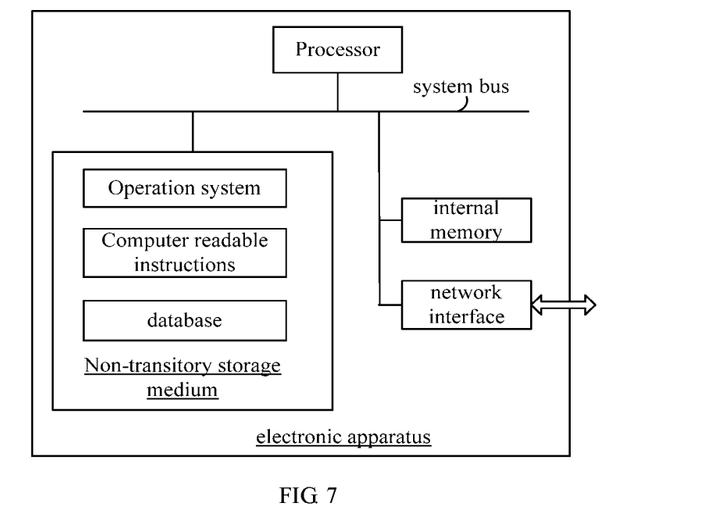
FIG. 7 is an internal structural diagram of the electronic apparatus provided by one or more embodiments of the present application.

In one embodiment, the internal structure diagram of the above-mentioned electronic apparatus may be as shown in FIG. 7, including a processor, a memory, a network interface and a database connected by means of a system bus. Among them, the processor of the electronic apparatus is configured for providing computing and control capabilities. The memory of this electronic apparatus includes a non-transitory storage medium and an internal memory. The non-transitory storage medium stores an operating system, computer-readable instructions and a database. The internal memory provides an environment for the operation of the operating system and the computer-readable instructions in the non-transitory storage medium. The database of the electronic apparatus is configured to store data for example sorting task data corresponding to the package, and the stored data may also refer to the definition in the above-mentioned embodiment of the method. The network interface of the electronic apparatus is configured to communicate with an external terminal by means of a network connection. When the computer readable instruction is executed by a processor, implementing the step of the method for transmitting the video data and/or the method for decoding the video data.

It may be understood by a person skilled in the art that, the structure shown in FIG. 7 is merely a block diagram of a portion of the structure related to the solution of the present application, and does not constitute a limitation on the electronic apparatus to which the solution of the present application is applied. The electronic apparatus may include more or less components than these shown in the figure, or combine some components, or have different component arrangements.

Every embodiment in the present description is described in a progressive way, and every embodiment focuses on the differences from other embodiments, so it is merely necessary to refer to the same and similar portions among each of the embodiments. For the device disclosed in the embodiment, since it is corresponding to the method disclosed in the embodiment, the explanation is relatively simple, and the relevant portions refer to the description of the method. It should be noted that, for a person skilled in the art, several improvements and modifications may be made to the present application without departing from the principle of the present application, and these improvements and modifications also fall within the scope of protection of the claims of the present application.

It should also be noted that, in the present description, relational terms for example first and second are merely used to distinguish one entity or operation from another entity or operation, and do not necessarily require or imply any such actual relationship or order between these entities or operations. Moreover, the terms "include", "include" or any other variation thereof are intended to cover non-exclusive inclusion, so that a process, a method, a product or an apparatus including a series of elements includes not merely those elements, but also other elements not explicitly listed or elements inherent to such process, method, article or apparatus. Without more restrictions, an element defined by the phrase "including one" does not exclude the existence of other identical elements in a process, a method, a product or an apparatus including the element.

The invention claimed is:

1. A method for transmitting video data, applied to a chip for substrate management control, wherein the method for transmitting the video data comprises:

compressing the video data sent by a host end to obtain video compression data, and respectively storing the video compression data into a first storage space and a second storage space according to a ping-pong operation structure, so that the first storage space stores video compression data of odd frames, and the second storage space stores video compression data of even frames;

when a data transmission instruction is received, reading first data to be transmitted with a preset byte length from the first storage space, and reading second data to be transmitted with the preset byte length from the second storage space;

determining whether a similarity between the first data to be transmitted and the second data to be transmitted is greater than or equal to a preset value;

when the similarity between the first data to be transmitted and the second data to be transmitted is greater than or equal to the preset value, setting the first data to be transmitted added with a first transmission identifier as current frame data, and setting a second transmission identifier corresponding to the first transmission identifier as next frame data; and sending the current frame data and the next frame data to a video data receiving end.

2. The method for transmitting the video data according to claim 1, wherein after the step of, determining whether the similarity between the first data to be transmitted and the second data to be transmitted is greater than the preset value, the method further comprises:

when the similarity between the first data to be transmitted and the second data to be transmitted is less than the preset value, setting the first data to be transmitted as the current frame data and setting the second data to be transmitted as the next frame data.

3. The method for transmitting the video data according to claim 1, wherein before the step of, setting the first data to be transmitted added with the first transmission identifier as the current frame data, the method further comprises:

generating the first transmission identifier corresponding to the first data to be transmitted; wherein, the first transmission identifier comprises an identification field Flag, a frame type field First_frame, a start position field Begin_cnt, and a repeated data length field pixel_num; and a value of the frame type field First_frame of the first transmission identifier is 1.

4. The method for transmitting the video data according to claim 1, wherein the step of, setting the first data to be transmitted added with a first transmission identifier as the current frame data comprises:

adding the first transmission identifier before the first data to be transmitted to obtain the current frame data.

5. The method for transmitting the video data according to claim 1, wherein before the step of, setting a second transmission identifier corresponding to the first transmission identifier as the next frame data, the method further comprises:

generating the second transmission identifier corresponding to the first transmission identifier; wherein, the second transmission identifier comprises an identification field Flag, a frame type field First_frame, a start position field Begin_cnt, and a repeated data length field pixel_num; the value of the frame type field First_frame of the second transmission identifier is 0, and the value of the identification field Flag, the start position field Begin_cnt and the repeated data length field pixel_num in the second transmission identifier are all the same as those of the first transmission identifier.

6. A method for decoding video data, applied to a video data receiving end, wherein the method for decoding the video data comprises:
- receiving the current frame data and the next frame data transmitted by the chip for substrate management control, by means of the method for transmitting video data according to claim 1;
- determining whether the current frame data comprises a first transmission identifier; when the current frame data comprises the first transmission identifier, decoding the first data to be transmitted in the current frame data to obtain a first decoding result, and adding the first decoding result to a cache;
- determining whether the next frame data comprises a second transmission identifier; when the next frame data comprises the second transmission identifier, reading the first decoding result from the cache as a second decoding result corresponding to the next frame data; and
- generating video data to be displayed according to the first decoding result and the second decoding result.

7. The method for decoding the video data according to claim 6, wherein after the step of, determining whether the current frame data comprises the first transmission identifier, the method further comprises:
- when the current frame data does not comprise the first transmission identifier, decoding the current frame data and the next frame data to obtain a first decoding result and a second decoding result.

8. The method for decoding the video data according to claim 6, wherein after the step of, determining whether the next frame data comprises the second transmission identifier, the method further comprises:
- when the next frame data does not comprise the second transmission identifier, decoding the next frame data to obtain the second decoding result.

9. An electronic apparatus, wherein the apparatus comprises a memory and one or more processors, wherein computer-readable instructions are stored in the memory, and when the computer-readable instructions in the memory are invoked by the one or more processors, implementing the step of the method for transmitting the video data according to claim 1.

10. A non-transitory computer readable medium, wherein the medium has a computer-readable instruction stored thereon, and when the computer-readable instruction is executed, implementing the step of the method for transmitting the video data according to claim 1.

11. A non-transitory computer readable medium, wherein the medium has a computer-readable instruction stored thereon, and when the computer-readable instruction is executed, implementing the step of the method for decoding the video data according to claim 6.

12. The electronic apparatus according to claim 9, wherein the method for transmitting the video data is applied to a chip for substrate management control, comprising:
- compressing the video data sent by a host end to obtain video compression data, and respectively storing the video compression data into a first storage space and a second storage space according to a ping-pong operation structure;
- when a data transmission instruction is received, reading first data to be transmitted with a preset byte length from the first storage space, and reading second data to be transmitted with the preset byte length from the second storage space;
- determining whether a similarity between the first data to be transmitted and the second data to be transmitted is greater than or equal to a preset value;
- when the similarity between the first data to be transmitted and the second data to be transmitted is greater than or equal to the preset value, setting the first data to be transmitted added with a first transmission identifier as current frame data, and setting a second transmission identifier corresponding to the first transmission identifier as next frame data; and
- sending the current frame data and the next frame data to a video data receiving end.

13. The electronic apparatus according to claim 12, wherein after the step of, determining whether the similarity between the first data to be transmitted and the second data to be transmitted is greater than the preset value, the method further comprises:
- when the similarity between the first data to be transmitted and the second data to be transmitted is less than the preset value, setting the first data to be transmitted as the current frame data and setting the second data to be transmitted as the next frame data.

14. The electronic apparatus according to claim 12, wherein before the step of, setting the first data to be transmitted added with the first transmission identifier as the current frame data, the method further comprises:
- generating the first transmission identifier corresponding to the first data to be transmitted; wherein, the first transmission identifier comprises an identification field Flag, a frame type field First_frame, a start position field Begin_cnt, and a repeated data length field pixel_num; and a value of the frame type field First_frame of the first transmission identifier is 1.

15. The electronic apparatus according to claim 12, wherein the step of, setting the first data to be transmitted added with a first transmission identifier as the current frame data comprises:
- adding the first transmission identifier before the first data to be transmitted to obtain the current frame data.

16. The electronic apparatus according to claim 12, wherein before the step of, setting a second transmission identifier corresponding to the first transmission identifier as the next frame data, the method further comprises:
- generating the second transmission identifier corresponding to the first transmission identifier; wherein, the second transmission identifier comprises an identification field Flag, a frame type field First_frame, a start position field Begin_cnt, and a repeated data length field pixel_num; the value of the frame type field First_frame of the second transmission identifier is 0, and the value of the identification field Flag, the start position field Begin_cnt and the repeated data length field pixel_num in the second transmission identifier are all the same as those of the first transmission identifier.

17. An electronic apparatus, wherein the apparatus comprises a memory and one or more processors, wherein computer-readable instructions are stored in the memory, and when the computer-readable instructions in the memory are invoked by the one or more processors, implementing the step of the method for decoding the video data according to claim 6.

18. The electronic apparatus according to claim 17, wherein the method for decoding video data is applied to a video data receiving end, comprising:

receiving the current frame data and the next frame data transmitted by the chip for substrate management control, by means of the method for transmitting video data according to claim 1;

determining whether the current frame data comprises a first transmission identifier; when the current frame data comprises the first transmission identifier, decoding the first data to be transmitted in the current frame data to obtain a first decoding result, and adding the first decoding result to a cache;

determining whether the next frame data comprises a second transmission identifier; when the next frame data comprises the second transmission identifier, reading the first decoding result from the cache as a second decoding result corresponding to the next frame data; and generating video data to be displayed according to the first decoding result and the second decoding result.

19. The electronic apparatus according to claim 18, wherein after the step of, determining whether the current frame data comprises the first transmission identifier, the method further comprises:

when the current frame data does not comprise the first transmission identifier, decoding the current frame data and the next frame data to obtain a first decoding result and a second decoding result.

20. The electronic apparatus according to claim 18, wherein after the step of, determining whether the next frame data comprises the second transmission identifier, the method further comprises:

when the next frame data does not comprise the second transmission identifier, decoding the next frame data to obtain the second decoding result.

\* \* \* \* \*